United States Patent
Miyamoto

(10) Patent No.: US 7,942,433 B2
(45) Date of Patent: May 17, 2011

(54) BRACKET FOR FIXING A FORK OF A VEHICLE

(75) Inventor: Takehiro Miyamoto, Shizuoka-Ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 301 days.

(21) Appl. No.: 12/155,179

(22) Filed: May 30, 2008

(65) Prior Publication Data

US 2008/0296861 A1    Dec. 4, 2008

(30) Foreign Application Priority Data

May 30, 2007    (JP) .................................. 2007-143053

(51) Int. Cl.
*B62K 21/04*    (2006.01)
(52) U.S. Cl. ......................... 280/280; 280/276; 280/279
(58) Field of Classification Search .................. 280/276, 280/279, 280
See application file for complete search history.

(56) References Cited

U.S. PATENT DOCUMENTS

| | | | | |
|---|---|---|---|---|
| 2,543,991 A | * | 3/1951 | Schuricht ...................... | 280/276 |
| 4,267,663 A | * | 5/1981 | Nagahara ...................... | 446/440 |
| 4,268,055 A | * | 5/1981 | Bell .............................. | 280/278 |
| 4,342,175 A | * | 8/1982 | Cernansky et al. ........... | 446/440 |
| 4,383,388 A | * | 5/1983 | Suimon ......................... | 446/440 |
| 4,705,285 A | * | 11/1987 | Yoshida ....................... | 280/279 |
| 4,902,271 A | * | 2/1990 | Yoneda ........................ | 446/440 |
| 4,966,569 A | * | 10/1990 | Asano .......................... | 446/440 |
| D344,253 S | * | 2/1994 | Bishop et al. ................ | D12/118 |
| 5,489,232 A | * | 2/1996 | Chang .......................... | 446/440 |
| 5,820,439 A | * | 10/1998 | Hair, III ....................... | 446/233 |
| 6,164,675 A | * | 12/2000 | Pickering ..................... | 280/277 |
| 7,441,622 B2 | * | 10/2008 | Costa ........................... | 180/219 |
| 2008/0129009 A1 | * | 6/2008 | Czysz .......................... | 280/275 |

FOREIGN PATENT DOCUMENTS

| | | | |
|---|---|---|---|
| JP | 2-7089 | | 1/1990 |
| JP | 09150771 A | * | 6/1997 |

* cited by examiner

*Primary Examiner* — Joanne Silbermann
*Assistant Examiner* — Daniel Yeagley
(74) *Attorney, Agent, or Firm* — Rabin & Berdo, P.C.

(57) ABSTRACT

A vehicle has a vehicle body including a head pipe, a lower side bracket disposed below the head pipe for supporting the head pipe upward in a substantial center of the bracket in the vehicle width direction, and a pair of legs of a front fork fixed in vicinities of the ends of the lower side bracket. The lower side bracket is formed to have a downward sloping shape, which slopes from the ends of the lower side bracket toward its center.

19 Claims, 7 Drawing Sheets

BRACKET FOR FIXING A FORK OF A VEHICLE

BACKGROUND OF THE INVENTION

1. Technical Field

The present invention relates to a vehicle, for example a motorcycle, and particularly to a bracket for fixing a front fork of the vehicle.

2. Background Art

A vehicle provided with a front fork, and a bracket for fixing the front fork is known. For example, Japanese Patent Document JP-U-Hei 2-7089 discloses a mounting structure of a handlebar of a motorcycle. The mounting structure includes a head pipe, and a lower side bracket disposed below the head pipe and that supports the head pipe. The lower side bracket has an upper flat surface and a lower flat surface. The front fork has a pair of legs, each being respectively fixed in a vicinity of an end of the lower side bracket in a width direction of the vehicle, so that the legs support the head pipe via the lower side bracket.

SUMMARY OF THE INVENTION

An object of the present invention is to provide a vehicle which can prevent a position of the center of gravity from becoming too high, while ensuring the front fork has a large stroke.

In order to achieve the above and other objects, a vehicle according to one aspect of the present invention includes: a vehicle body including a head pipe; a lower side bracket disposed below the head pipe for supporting the head pipe in a substantial center in a width direction of the vehicle; and a pair of front forks fixed in vicinities of both ends of the lower side bracket in the width direction of the vehicle, in which the lower side bracket is formed in a downward bending shape from the both ends of the lower side bracket in the width direction of the vehicle toward the substantial center in the width direction of the vehicle.

The vehicle according to one aspect includes, as described above, the lower side bracket supported by the head pipe in the substantial center in the width direction of the vehicle and a pair of the front forks fixed in the vicinities of both ends of the lower side bracket in the width direction of the vehicle, in which the lower side bracket is formed in a downward bending shape from the ends of the lower side bracket in the width direction of the vehicle toward the substantial center in the width direction of the vehicle. As a result, even when a position of the lower side bracket is disposed upward in order to extend a stroke of a pair of the front forks than that in the case that the lower side bracket is formed with a flat surface, a substantial center of the lower side bracket in the width direction of the vehicle is disposed more downward than the vicinities of the ends of the lower side bracket in the width direction of the vehicle. Accordingly, it can be prevented that a position of the head pipe supported by the substantial center of the lower side bracket in the width direction of the vehicle is disposed upward. In this manner, it can be prevented that a position of the center of gravity of the vehicle becomes higher. In other words, it can be prevented that the position of the center of gravity becomes higher while a large stroke of the front forks is secured.

In the vehicle according to one aspect, preferably, the lower side bracket is formed in a V-shape which declines downward from the ends of the lower side bracket in the width direction of the vehicle toward the substantial center in the width direction of the vehicle. According to this structure, it is easy to obtain the lower side bracket in a downward bending shape from the both ends in the width direction of the vehicle toward the substantial center in the width direction of the vehicle.

In the vehicle according to one aspect, preferably, the lower side bracket is constructed in a V-shape in which both the upper surface and the lower surface of the lower side bracket decline downward from the ends of the lower side bracket in the width direction of the vehicle toward the substantial center in the width direction of the vehicle. According to this structure, as a thickness of the lower side bracket can be made smaller than that in the case that the upper surface of the lower side bracket is formed to have a flat surface, the weight of the lower side bracket can be reduced.

Preferably, the vehicle according to one aspect further includes a shaft connected to the lower side bracket and rotatable in relation to the head pipe, an upper side bracket disposed to cover the head pipe from an upper direction thereof at the substantial center in the width direction of the vehicle and connected to the shaft, and a pair of the front forks, in which the upper side bracket is formed in a downward bending shape from the ends of the upper side bracket in the width direction of the vehicle toward the substantial center in the width direction of the vehicle. According to this structure, a position of the substantial center of the upper side bracket in the width direction of the vehicle can be made lower than that in the case that the upper side bracket is formed with a flat surface. Consequently, it is possible to dispose the upper side bracket above the head pipe in a state that it is prevented that the head pipe is extended upward. As a result, it can be further prevented that the position of the center of gravity of the vehicle becomes higher.

In the vehicle including the upper side bracket, preferably, the lower surface of the lower side bracket is formed in a V-shape which declines downward from the ends of the lower side bracket in the width direction of the vehicle toward the substantial center in the width direction of the vehicle. Further, the lower surface of the upper side bracket is formed in a V-shape which declines downward from the ends of the upper side bracket in the width direction of the vehicle toward the substantial center in the width direction of the vehicle, and a degree of an angle formed by the lower surface in the V-shape declining downward from the ends of the lower side bracket in the width direction of the vehicle toward the substantial center in the width direction of the vehicle is constructed to be smaller than a degree of an angle formed by the lower surface in the V-shape declining downward from the ends of the upper side bracket in the width direction of the vehicle toward the substantial center in the width direction of the vehicle. According to this structure, as a position of ends of the lower side bracket in the width direction of the vehicle can be disposed at a higher position, it is possible to secure a larger stroke of the front fork.

In the vehicle including the upper side bracket, preferably, the upper side bracket is formed in a V-shape which declines downward from the ends of the upper side bracket in the width direction of the vehicle toward the substantial center in the width direction of the vehicle. According to this structure, it is easy to obtain the upper side bracket in a downward bending shape from the ends in the width direction of the vehicle toward the substantial center in the width direction of the vehicle.

In the vehicle according to one aspect, preferably, the upper surface of the lower side bracket is provided with a support section, which is substantially flat, for supporting a lower end of the head pipe. According to this structure, it is possible to obtain the lower side bracket that stably supports the head pipe.

Preferably, the vehicle having the upper surface of the lower side bracket provided with the support section, which is substantially flat, for supporting the head pipe further includes a handlebar connected to the upper side bracket for rotating the upper side bracket in a same direction as a direction of steering and a shaft provided to connect the upper side bracket and the lower side bracket, rotated in a same direction as a direction in which the upper side bracket is rotated, and rotating the lower side bracket in a same direction as a direction in which the upper side bracket is steered. In addition, the shaft is supported by a first bearing member disposed on the upper end of the head pipe and a second bearing member disposed on the lower end of the head pipe and located above the support section of the lower side bracket. According to this structure, the shaft can be supported by two separate points on the upper end and the lower end thereof by the first bearing member and the second bearing member. Consequently, it is possible to stably support the shaft.

In this case, preferably, a headlamp and a stay for holding the headlamp are further provided. In addition, the stay is attached to the upper side bracket in front of the head pipe. According to this structure, it is possible to turn the headlamp with the stay in front of the head pipe in a direction in which the upper side bracket is turned by steering the handlebar. Consequently, it is possible to direct the light emitted by the headlamp toward the driving direction.

Preferably, the vehicle according to one aspect further includes an upper side bracket disposed to cover the head pipe from an upper direction thereof at the substantial center in the width direction of the vehicle and connected to a pair of the front forks, a handlebar connected to the upper side bracket for rotating the upper side bracket in a same direction as the direction of steering, and a shaft connected to the upper side bracket and the lower side bracket and rotatable in relation to the head pipe, in which the lower side bracket is formed in a downward bending shape from the ends of the lower side bracket in the width direction of the vehicle toward the direction in the width direction of the vehicle where the shaft is substantially provided. According to this structure, it is possible to easily obtain the lower side bracket that is able to prevent the position of the center of gravity from becoming higher.

Preferably, the vehicle according to one aspect further includes a guide board provided in a lower part of the lower side bracket for assisting air passing below the lower side bracket in flowing rearward. According to this structure, it is possible to reduce air resistance applied to the vehicle.

In this case, preferably, the guide board is formed in a V-shape which declines downward from the ends of the guide board in the width direction of the vehicle toward the substantial center in the width direction of the vehicle. According to this structure, an air flow passing the lower surface of the lower side bracket can be divided into the left side and the right side in the width direction of the vehicle at the substantial center of the lower side bracket in the width direction of the vehicle and, in addition, can be drawn in the rear direction. Consequently, it can be prevented that the air flow passing the lower surface of the lower side bracket blows directly on the operator. In this manner, it is possible to reduce air resistance during driving, and it is possible to reduce a load on the operator.

In the vehicle according to one aspect, preferably, the lower side bracket is formed such that the substantial center of the lower side bracket in the width direction of the vehicle is projected forward in the running direction. According to this structure, the air flow blowing on a front part of the lower side bracket can be divided into the left side and the right side in the width direction of the vehicle in the substantial center of the lower side bracket in the width direction of the vehicle and, in addition, can be drawn in the rear direction. Consequently, it is possible to smoothly pass the air flow in the rear direction.

DETAILED DESCRIPTION OF THE INVENTION

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

The present invention is directed toward a bracket for fixing a front fork of a vehicle. In the exemplary embodiment, the vehicle is a motorcycle. However, it is contemplated that the concepts of the present invention may be applied to other types of vehicles within the spirit and scope of the invention. For example, the vehicle may be any vehicle having a front fork and a bracket for fixing the front fork, such as a bicycle, a three-wheeled vehicle, or an ATV (all terrain vehicle).

Figure 1:
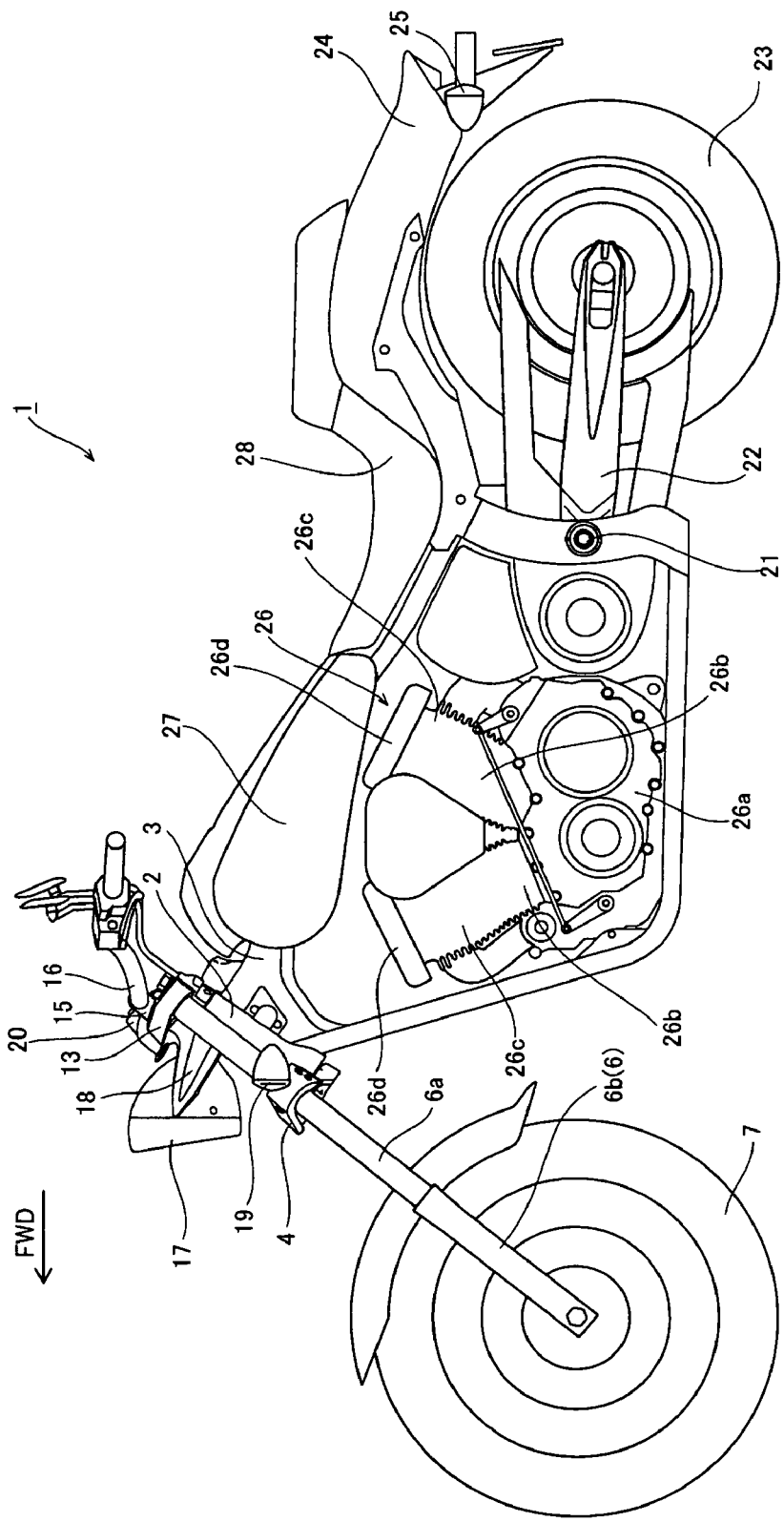
FIG. 1 is a side view illustrating an entire structure of a motorcycle according to one embodiment of the present invention.
Figure 2:
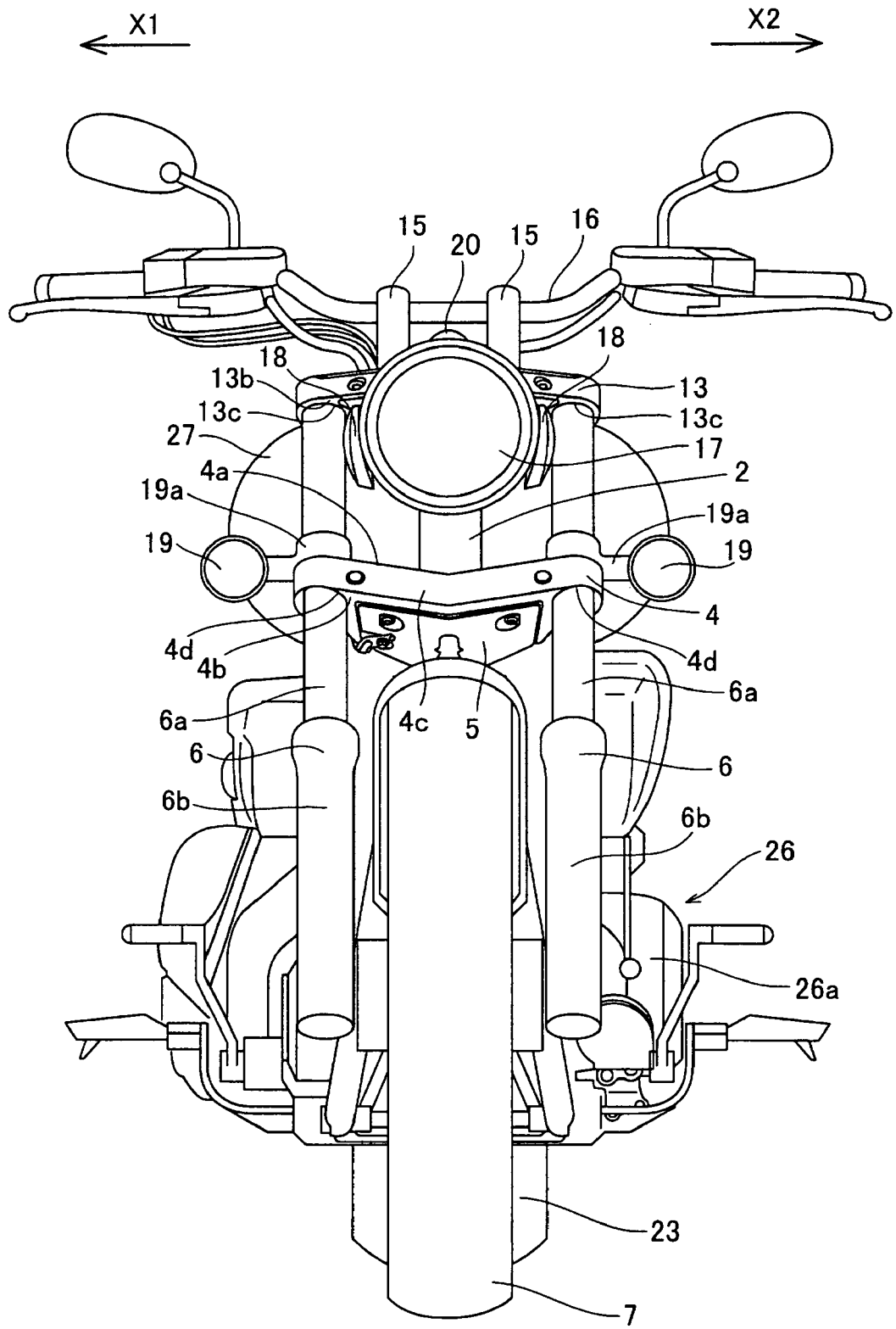
FIG. 2 is a front view of the motorcycle shown in FIG. 1.

Referring to FIG. 1, a side view of an entire motorcycle according to one embodiment of the present invention is illustrated. FIG. 2 is a front view illustrating the entire vehicle shown in FIG. 1. In the drawings, the FWD arrow indicates a forward direction in which the vehicle runs. Further, any reference to a front and rear of the vehicle will be used in the usual and customary manner. Moreover, any reference to the width direction of the vehicle will be taken to mean in a direction perpendicular to the FWD arrow, and in the direction of the arrows X1 and X2, as shown in FIG. 2.

As shown in FIG. 1, the vehicle body is formed by a head pipe 2 and a mainframe 3. Mainframe 3 is connected to a rear part of the head pipe 2.

Figure 3:
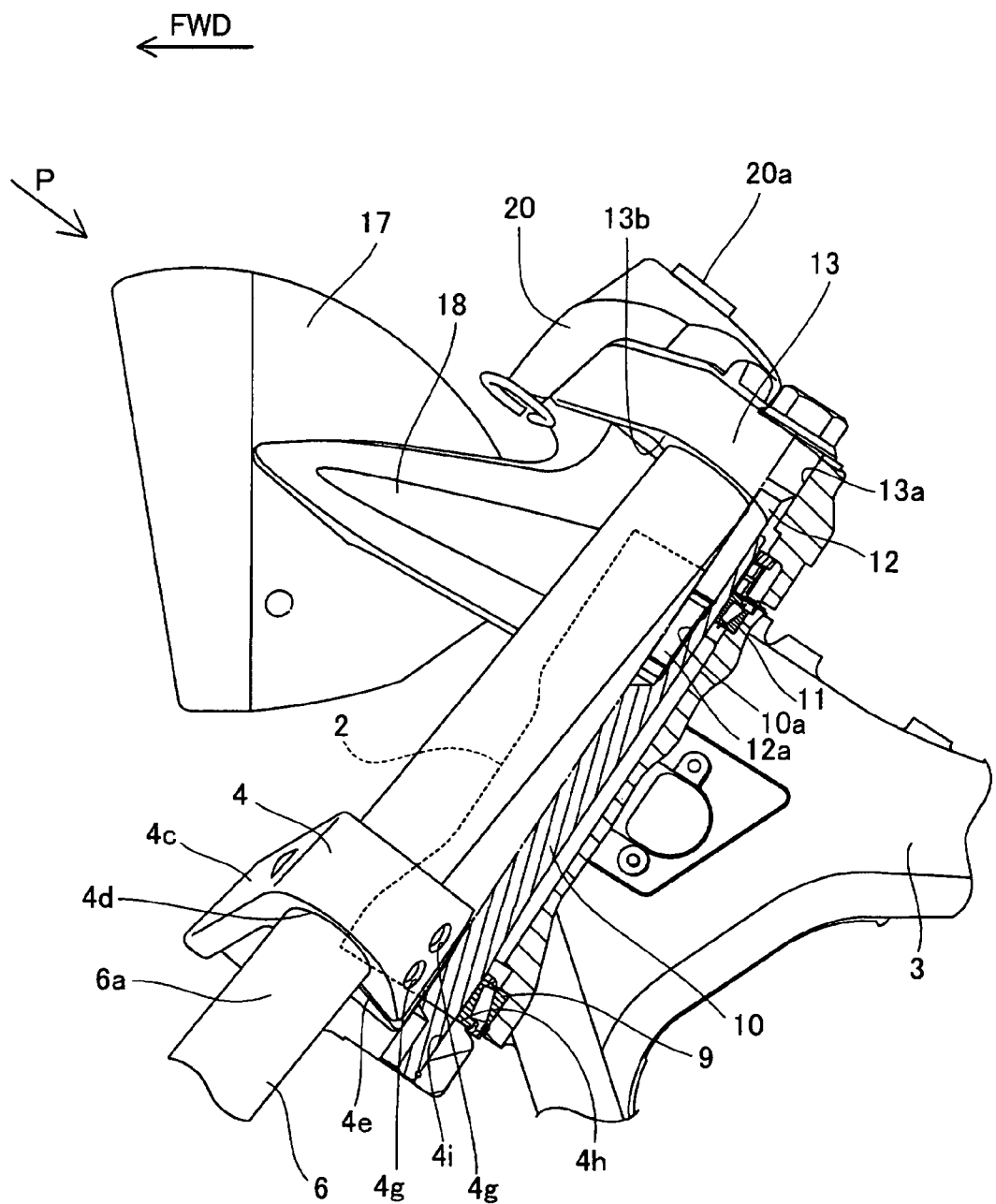
FIG. 3 is a partial cross-sectional side view illustrating a head pipe and surrounding structure of the motorcycle shown in FIG. 1.

As shown in FIGS. 2 and 3, an under bracket, such as lower side bracket 4, is disposed below the head pipe 2. The lower side bracket 4 is rotatable relative to the head pipe 2. The lower side bracket 4 supports the head pipe 2 at a center of the bracket (and at substantial center of the vehicle) in the vehicle width direction, so that the head pipe projects upwards from the lower side bracket.

Figure 4:
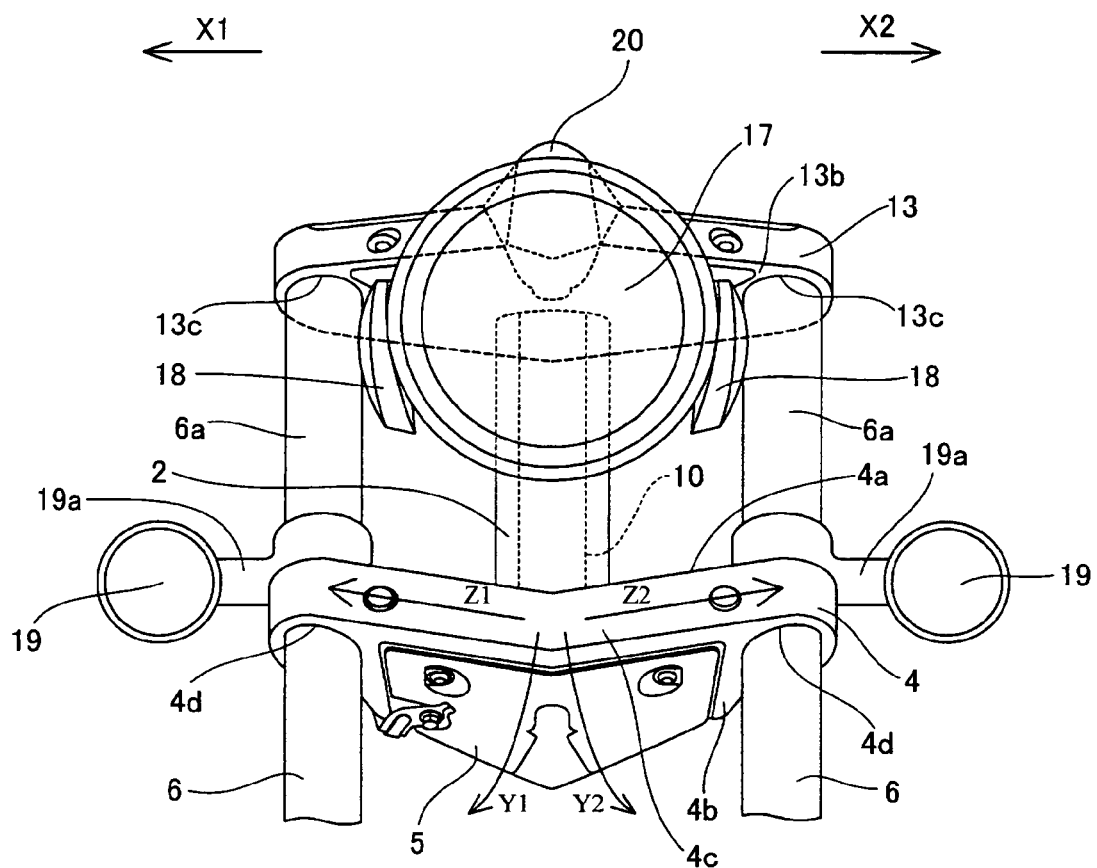
FIG. 4 is a front view illustrating a lower bracket and an upper bracket of the motorcycle shown in FIG. 1.
Figure 5:
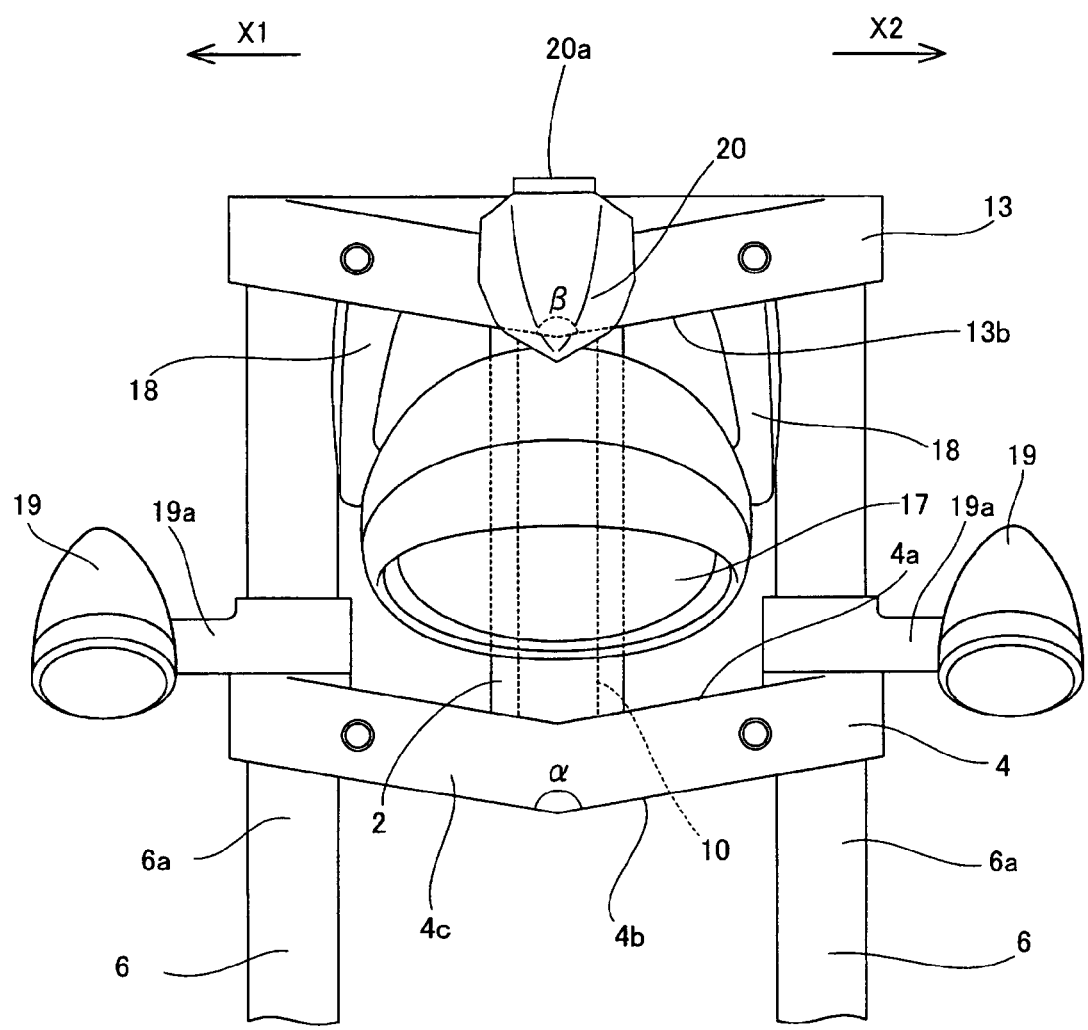
FIG. 5 is a view seen from a direction of the arrow P in FIG. 3.

As shown in FIG. 4, the lower side bracket 4 is formed to have a shape that bends downward from both the left and right sides of the vehicle toward the center of the lower side bracket. Specifically, as shown in FIG. 5, the lower side bracket 4 is formed so that both an upper surface 4a and a lower surface 4b thereof have essentially a V-shape which declines downward from both ends of the lower side bracket 4 in the width direction of the vehicle toward the center of the lower side bracket. Thus, the center of the lower side bracket will be disposed lower than the ends thereof. Further, as will be more fully explained latter, the center of the lower side bracket is where a steering shaft 10 is connected. As a result, even if the center of the lower surface 4b of the lower side bracket 4 will be disposed at a position lower than a highest position of upward movement of outer tubes 6b (see FIG. 1) of front fork 6, since the ends are disposed higher than the center, the outer tubes 6b will not come in contact with the lower surface 4b of the lower side bracket 4. Further, the center of the lower side bracket 4 is disposed more downward relative to the ends of the lower side bracket than if the lower side bracket were formed to have a flat configuration. Consequently, a position of the head pipe 2, which is supported by the center of the lower side bracket 4, is prevented from being disposed too high. As a result, a position of the center of gravity of the vehicle 1 is prevented from being too high. Further, an interior angle formed by the lower surface 4b due to the V-shape of the lower side bracket 4 is configured to be an angle $\alpha$. Angle $\alpha$ may be an angle ranging from 0 to 180 degrees.

In another aspect of the invention, the lower surface of the lower side bracket 4 may be adapted to receive hoses or the like (not shown). As shown in FIG. 4, a guide board 5, made of sheet metal for example, may be provided on the lower surface 4b of the lower side bracket 4. The guide board 5 may be attached to the lower surface 4b of the lower side bracket 4 for covering the hoses or the like. Thus, the guide board 5 assists air passing below the lower side bracket 4 to flow rearward, by covering obstructions that may block the air flow. Further, the guide board 5 may be formed to have a V-shape which bends downward from both ends thereof toward its center in the vehicle width direction. As a result, air flowing past a lower surface of the guide board 5 can be divided and directed toward the left and the right sides of the vehicle, in the directions indicated by the arrow Y1 and the arrow Y2, before being drawn in the rearward direction. Consequently, air flowing past the lower surface 4b of the bracket 4 will be prevented from blowing directly on the operator. As a result, air resistance is reduced while driving the vehicle, and a load against the operator is reduced.

Figure 6:
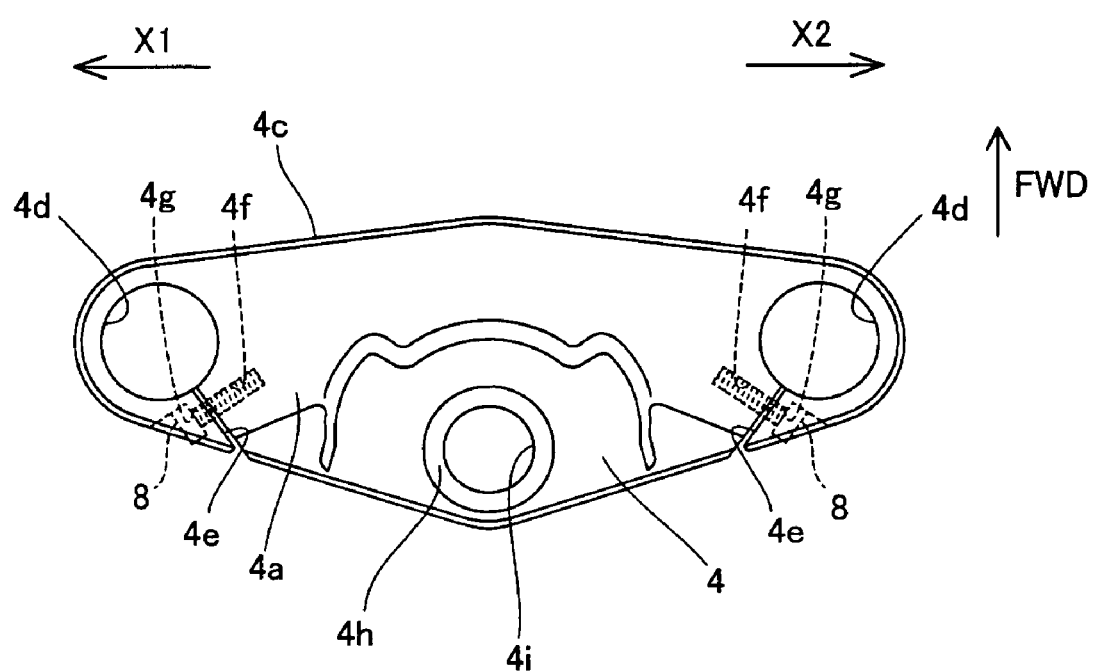
FIG. 6 is a plan view illustrating the lower bracket of the motorcycle shown in FIG. 1.

In one exemplary aspect of the invention, as shown in FIG. 3 and FIG. 6, a front part 4c of the lower side bracket 4 is formed such that the center of lower side bracket 4 projects in the forward direction (the direction indicated by the arrow FWD) (see FIG. 3). That is, and as best shown in FIG. 6, the front part 4c forms a V-shape, as viewed from above. As such, the air blowing on the front part 4c can be divided to flow in the direction indicated by the arrow Z1 and the direction indicated by the arrow Z2 (see FIG. 4) prior to being drawn in the rear direction. Consequently, it is possible to smoothly direct the air flow in the rearward direction.

As shown in FIG. 4 and FIG. 6, a pair of front fork mounting holes 4d are formed a region of the respective ends of the lower side bracket 4. Further, as shown in FIG. 4, each leg of the front fork 6 is inserted in a respective one of the mounting holes 4d. Moreover, and referring back to FIG. 2, each leg includes an inner tube 6a disposed on the upper side (the side toward a handlebar 16), and an outer tube 6b disposed on the lower side (the side toward a front wheel 7). The outer tube 6b is slidable on an outer circumference of the inner tube 6a. Further, as shown in FIGS. 1 and 2, the front wheel 7 is rotatably mounted on a lower part of the outer tubes 6b. The front fork 6, on which the front wheel 7 is mounted, thus supports the vehicle body via the lower side bracket 4.

As shown in FIG. 6, a slit 4e is formed between an inner circumference of each respective mounting hole 4d and a rear side of the lower side bracket 4. The rear side is the side opposite to the direction indicated by the FWD arrow. A screw hole 4f is formed in the lower side bracket 4 on one side of the slit 4e, and a screw insertion hole 4g is formed on another opposite side of the slit 4e. A screw 8 is inserted through the screw insertion hole 4g and threaded into the screw hole 4f. The screw thus can be used to reduce the size of the slit, and hence the diameter of the mounting hole 4d. Thus, when the respective leg of the fork is received within the respective mounting hole, the lower side bracket can be firmly fixed to the front fork by tightening the screw, thus reducing the diameter of the mounting hole, to clamp to the lower side bracket to the front fork. As a result, it is possible to firmly fix the front fork 6 relative to the lower side bracket 4. Further, as shown in FIG. 2, the inner tubes 6a are inserted in the front fork mounting holes 4d and fixed therein, so that a closest position the outer tubes 6b will be to the lower surface of the lower side bracket (e.g., when the front fork is fully compressed) will be a position in which the outer tubes are separated from the lower surface 4b of the lower side bracket 4 by a space.

In an exemplary aspect of the invention, and as shown in FIGS. 3 and 6, a rear side of the upper surface 4a of the lower side bracket 4 includes a substantially flat support section 4h, for supporting a lower end of the head pipe 2. Specifically, the support section 4h is adapted to support a bearing member, such as tapered bearing 9, whose outer circumference is fitted in an inner circumference of the lower end of the head pipe 2. Further, the support section 4h is located at the center of the bracket 4 in the vehicle width direction, and is disposed at a lowermost portion of the V-shape of the upper surface of the lower side bracket. In other words, the lower side bracket 4 supports the head pipe 2 at a lowest portion of the upper surface via the tapered bearing 9. As a result, the portion that supports the head pipe 2 is prevented from being too high.

Further, a shaft insertion hole 4i is provided in the support section 4h. The shaft, such as steering shaft 10 (see FIG. 3), is fitted in the shaft insertion hole 4i. As shown in FIG. 3, the steering shaft 10 is disposed to extend above the support section 4h and is inserted in an inner circumference of the tapered bearing 9. Further, an upper part of the steering shaft 10 is inserted in an inner circumference of a further bearing member, such as tapered bearing 11. An outer circumference of the tapered bearing 11 is fitted in an upper end of the head pipe 2. As a result, the tapered bearing 9 and the tapered bearing 11 can support the steering shaft 10 at two separate points, e.g., at an upper end and lower end of the steering shaft 10. Consequently, it is possible to stably support the steering shaft 10.

Figure 7:
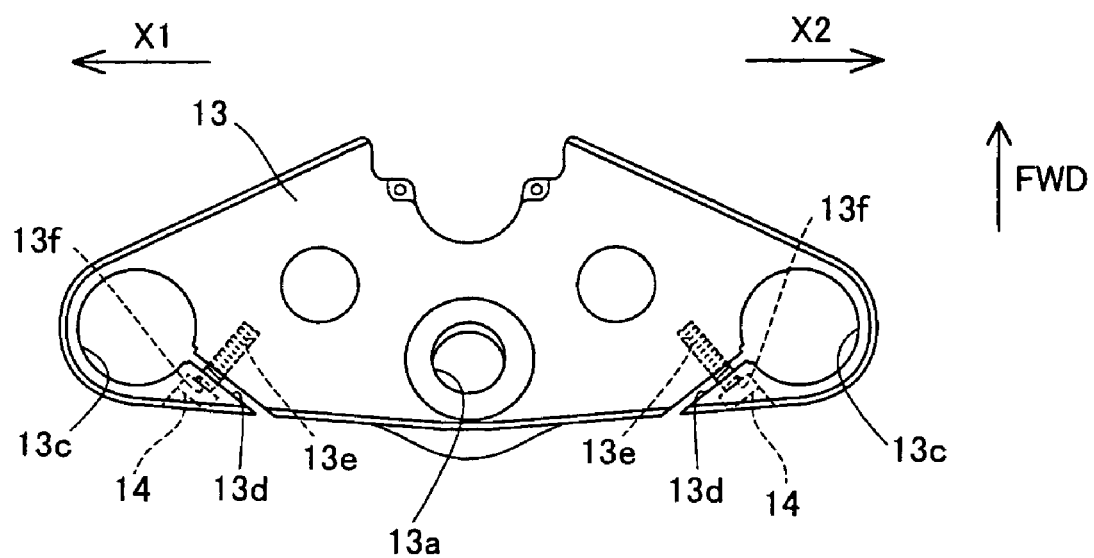
FIG. 7 is a plan view illustrating the upper bracket of the motorcycle shown in FIG. 1.

In an exemplary aspect of the invention, and referring to FIGS. 2, 3 and 7, the upper part of the steering shaft 10 is fixed to an upper bracket 13 via a connecting member 12. The upper bracket 13 is disposed so that a center of bracket 14, in the vehicle width direction, covers the head pipe 2. In addition, the connecting member 12 has a screw thread on an end 12a thereof. The end 12a receives a threaded member, such as screw 10a, that is formed on an upper end of the steering shaft 10. As a result, the connecting member 12 and the steering shaft 10 are firmly connected with each other. In addition, an upper part of the connecting member 12 is fitted within an engagement hole 13a of the upper bracket 13. This configuration prevents the upper bracket 13 and the connecting member 12 from rattling. As a result, the upper bracket 13 is connected to the under bracket 4 via the connecting member 12 and the steering shaft 10. In this manner, it is possible to turn the front wheel 7 (see FIG. 1) by steering the handlebar 16, which is connected to the upper bracket 13.

In an exemplary aspect of the invention, and as shown in FIG. 5, the upper bracket 13 is formed to have a shape that bends downward from both ends thereof toward the center thereof. Specifically, as shown in FIG. 5, the upper bracket 13 is formed so that a lower surface 13b thereof has essentially a V-shape which declines downward from both ends of the upper bracket 13 in the vehicle width direction toward the center. Further, an interior angle formed by the lower surface 13b due to the V-shape of the upper bracket 13 is configured to be an angle β. Angle β is configured to be larger than the angle α, and may be an angle ranging from 0 to 180 degrees.

As shown in FIG. 7, a pair of front fork mounting holes 13c is formed in vicinities of both ends of the upper bracket 13 in the vehicle width direction. The upper ends of the inner tubes 6a (see FIG. 1) of the front fork 6 are fixed within the respective front fork mounting holes 13c. Specifically, a slit 13d is formed between the inner circumference of each respective front fork mounting hole 13c and a rear side of the upper bracket 13. A screw hole 13e is formed in the upper bracket 13 on one side of the slit 13d, and a screw insertion hole 13f is formed in the upper bracket on an opposite side of the slit 13d. A screw 14 inserted through the screw insertion hole 13f is screwed in the screw hole 13e. Thus, when the upper ends of the inner tubes 6a are inserted in the respective front fork mounting holes 13c, the diameter of the respective holes can be reduced by tightening the screw 14, thus decreasing the size of the gap of the slit, and thereby causing the inner tubes 6a to be clamped into a fixed position. As a result, it is possible to firmly fix the front fork 6 relative to the upper bracket 13.

As shown in FIG. 2, a pair of steering stays 15 may be provided on an upper part of the upper bracket 13. The steering stays 15 project upward. The handlebar, also referred to as a steering bar 16, which extends in the vehicle width direction, is fixed on an upper part of the steering stays 15. In other words, when the handlebar 16 is turned, the upper bracket 13 will be rotated in the same direction as the direction in which the handlebar 16 is steered via the steering stays 15.

In another exemplary aspect of the invention, and as shown in FIG. 3, a pair of stays, such as headlamp stays 18 for supporting a headlamp 17 attached thereto, may be provided on the upper bracket 13. The headlamp stays 18 may be fixed on the lower surface 13b of the upper bracket 13, and the headlamp stays 18 are rotated in a direction in which the upper bracket 13 is rotated.

Further, and in another exemplary aspect of the invention as shown in FIGS. 1 and 2, blinking lamps 19 may be disposed above the front fork mounting holes 4d of the lower side bracket 4. The blinking lamps 19 may be mounted on the inner tubes 6a of the front fork 6 via brackets 19a.

Further, a main power supply 20 of the vehicle 1 may be provided at a front part of the upper bracket 13. The main power supply 20 is constructed to project forward. In addition, a key slot 20a (see FIG. 3), in which a key (not shown) may be inserted, is provided in an upper part of the main power supply 20.

Further, as shown in FIG. 1, a pivot shaft 21 may be provided at a lower part of the mainframe 3. A front end of a rear arm 22 may be vertically swingably supported with its shaft by the pivot shaft 21. In addition, a rear wheel 23 may be rotatably mounted on a rear end of the rear arm 22. Further, a rear fender 24 may be disposed above the rear wheel 23, and a pair of blinking lamps 25 may be attached to a rear part of the rear fender 24.

Further, an engine 26 may be disposed on the mainframe 3. The engine 26 may be, for example, an air-cooled engine having a crankcase 26a, a cylinder block 26b, a cylinder head 26c, and a cylinder head cover 26b. In addition, a fuel tank 27 may be disposed above the engine 26. Further, a speedometer (not shown) may be disposed at an upper part of the fuel tank 27. Moreover, a seat 28 may be provided at a rear of the fuel tank 27.

According to the exemplary embodiments described above, the lower side bracket 4 supports the head pipe 2 in the center of the bracket 4 in the vehicle width direction, and the respective legs of the front fork 6 are fixed in the vicinities of both ends of the lower side bracket 4. Further, the lower side bracket 4 is formed in a downward bending shape which extends from both ends thereof, toward the center thereof. As a result, the position of the lower side bracket 4 may be disposed more upward to extend the stroke of the front fork 6 without causing the center of gravity to be too high, since the center of the lower side bracket 4 will be disposed below the vicinities of the ends of the lower side bracket 4. Therefore, the position of the head pipe 2 that is supported by the center of the lower side bracket 4 will be prevented from being disposed too far upward. As a result, the center of gravity of the vehicle 1 will be prevented from being too high. In other words, the position of the center of gravity is prevented from being too high, while a large stroke of the front fork 6 is ensured.

Further, according to the exemplary embodiments, the lower side bracket 4 is formed in a V-shape which declines downward from the ends thereof toward the substantial center of the bracket.

Further, according to the exemplary embodiments, the upper bracket 13 is formed in a downward bending shape which extends from both ends toward the center of bracket 13. Consequently, the position of the center of the upper bracket 13 in the vehicle width direction will be lower than if the upper bracket is formed with a flat surface. Consequently, it is possible to dispose the upper bracket 13 above the head pipe 2 in a state that the head pipe 2 is prevented from being extended too far upwards. As a result, it can be further prevented that the position of the center of gravity becomes too high.

Further, according to the exemplary embodiments, the angle α formed by the lower surface 4b having a V-shape is constructed to be smaller than the angle β formed by the lower surface 13b having a V-shape. Consequently, it is possible to better locate the positions of the ends of the lower side bracket 4. Accordingly, it is possible to obtain a larger stroke of the front fork 6.

Further, according to the exemplary embodiments, the upper surface 4a of the lower side bracket 4 is provided with the support section 4h, which is substantially flat, for supporting the lower end of the head pipe 2. Consequently, the lower side bracket 4 is able to stably support the head pipe 2.

The exemplary embodiments disclosed herein are illustrative only and are not to be considered as limiting in any aspects. The scope of the present invention is not defined by the embodiments but by the appended claims. All changes which come within the meaning and range of equality of the claims are incorporated within the scope of the invention.

Further, the exemplary embodiments illustrate an example in which the lower side bracket and the upper bracket are constructed to have a V-shape which declines downward from both ends thereof in the vehicle width direction toward the center thereof. The present invention, however, is not limited to this configuration. Instead, it is contemplated that at least one of the lower side bracket and the upper bracket may be constructed to have a U-shape, for example, or other equivalent shapes which are defined by a decline downward from both ends thereof toward the center thereof.

Further, the exemplary embodiments illustrate an example in which the lower side bracket and the upper bracket are constructed to be fixed with the inner tubes of the front fork, with the inner tubes being disposed at an upper side of the fork. The present invention, however, is not limited to this configuration. Instead, it is contemplated that the outer tubes may be disposed at the upper side of the fork, with the inner tubes being disposed at the lower side, and with the lower side bracket and the upper bracket being fixed with the outer tubes.

Further, the exemplary embodiments illustrate an example in which the guide board is provided at the lower part of the lower side bracket to facilitate the air passing below the lower side bracket in flowing rearward. The present invention, however, is not limited to this configuration. Instead, it is contemplated that the lower part of the lower side bracket be configured so that the air passing below the lower side bracket easily flows rearward without a guide board.

Further, the exemplary embodiments illustrate an example in which the tapered bearings are used for rotatably supporting the upper end and the lower end of the steering shaft. The present invention, however, is not limited to this configuration. Instead, it is contemplated that other types of bearings can be used, such as an angular bearing.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A vehicle, comprising:
  a vehicle body including a head pipe;
  a lower side bracket disposed below said head pipe and supporting said head pipe at a center of the bracket in a vehicle width direction, said lower side bracket having a shape that bends downward, in the vehicle width direction, from the ends of the lower side bracket toward the center of the lower side bracket; and
  a front fork having legs, each leg being fixed to a respective end of the lower side bracket,
  wherein a center, in the vehicle width direction, of the lower side bracket projects forward in a running direction from the ends of the lower side bracket.

2. The vehicle as recited in claim 1,
  wherein the lower side bracket has a V-shape which declines downward, in the vehicle width direction, from the ends of the lower side bracket toward the center of the lower side bracket.

3. The vehicle as recited in claim 1,
  wherein the lower side bracket has an upper surface and a lower surface, and has a V-shape in which both the upper surface and lower surface decline downward, in the vehicle width direction, from the ends of the lower side bracket toward the center of the lower side bracket.

4. The vehicle as recited in claim 1, further comprising:
  a shaft connected to the lower side bracket, the shaft being rotatable relative to the head pipe; and
  an upper side bracket disposed to cover the head pipe at a center thereof, and being connected to the shaft and the legs of the front fork, the upper side bracket having a shape that bends downward, in the vehicle width direction, from respective ends of the upper side bracket toward a center of the upper side bracket.

5. The vehicle as recited in claim 4,
  wherein a lower surface of the lower side bracket has a V-shape which declines downward, in the vehicle width direction, from respective ends of the lower side bracket toward a center of the lower side bracket,
  a lower surface of the upper side bracket has a V-shape which declines downward, in the vehicle width direction, from the ends of the upper side bracket toward the center of the upper side bracket, and
  an angle formed by the V-shape of the lower surface of the lower side bracket is smaller than an angle formed by the V-shape of the lower surface of the upper side bracket.

6. The vehicle as recited in claim 4,
  wherein the upper side bracket has a V-shape which declines downward, in the vehicle width direction, from the ends of the upper side bracket toward the center of the upper side bracket.

7. The vehicle as recited in claim 4, wherein an upper surface of the lower side bracket has a substantially flat support section, that supports a lower end of the head pipe; said vehicle further comprising:
  a handlebar connected to the upper side bracket that rotates the upper side bracket in a same direction as a direction of steering;
  a shaft that connects the upper side bracket and the lower side bracket, the shaft being rotated in a same direction as the upper side bracket is rotated, and rotating the lower side bracket in the same direction as the upper side bracket is rotated;
  a first bearing member disposed on an upper end of the head pipe and supporting the shaft at a first location; and
  a second bearing member disposed on a lower end of the head pipe, being located above the support section of the lower side bracket, and supporting the shaft at a second location.

8. The vehicle as recited in claim 7, further comprising:
  a headlamp; and
  a stay attached to the upper side bracket in front of the head pipe for holding the headlamp.

9. The vehicle as recited in claim 1,
  wherein an upper surface of the lower side bracket has a substantially flat support section, that supports a lower end of the head pipe.

10. The vehicle as recited in claim 1, further comprising:
  an upper side bracket disposed to cover the head pipe at a center thereof, and being connected to the legs of the front fork;
  a handlebar connected to the upper side bracket for rotating the upper side bracket in a same direction as a direction of steering; and
  a shaft connected to the upper side bracket and the lower side bracket and being rotatable relative to the head pipe, wherein the lower side bracket has a shape that slopes downward, in the vehicle width direction, from the ends of the lower side bracket toward where the shaft is connected thereto.

11. The vehicle as recited in claim 1, further comprising:
a guide board provided at a lower part of the lower side bracket, and being configured to facilitate a flow of air passing below the lower side bracket and flowing in a rearward direction.

12. A vehicle, comprising:
a vehicle body including a head pipe;
a lower side bracket disposed below said head pipe and supporting said head pipe at a center of the bracket in a vehicle width direction, said lower side bracket having a shape that bends downward, in the vehicle width direction, from the ends of the lower side bracket toward the center of the lower side bracket;
a front fork having legs, each leg being fixed to a respective end of the lower side bracket; and
a guide board provided at a lower part of the lower side bracket, and being configured to facilitate a flow of air passing below the lower side bracket and flowing in a rearward direction,
wherein the guide board has a V-shape which declines downward, in the vehicle width direction, from respective ends of the guide board toward a center of the guide board.

13. A component for a vehicle, the vehicle having a front fork and a head pipe, comprising:
a bracket having a center, two ends disposed on opposite sides of the center with each end being connectable to a respective leg of the front fork, and an upper surface adapted to support the head pipe at the center, the bracket having a shape that bends downward from the respective ends toward the center,
wherein the center of the bracket projects forward in a running direction from the two ends of the bracket.

14. The component recited in claim 13, wherein the bracket includes two mounting holes, each being disposed in a region of a respective end, and each being adapted to receive a respective leg of the front fork.

15. The component recited in claim 13, wherein the upper surface of the bracket has a substantially flat support section that is adapted to support a lower end of the head pipe.

16. The component recited in claim 13, wherein the bracket has a V-shape when viewed from a front direction thereof, with the center of the bracket being disposed at a base of the V-shape, and with the ends of the bracket being disposed at a high point of the V-shape.

17. The component recited in claim 13, wherein the bracket includes two mounting holes, each being disposed in a region of a respective end, and each being adapted to receive a respective leg of the front fork, and wherein the upper surface of the bracket has a substantially flat support section that is adapted to support a lower end of the head pipe, the flat support section being disposed between the mounting holes.

18. The component recited in claim 17, wherein the upper surface of the bracket in a region of the mounting holes is disposed higher than the flat support section.

19. The component recited in claim 13, wherein the upper surface in a region of the ends is disposed higher than the upper surface in a region of the center.

* * * * *